(12) United States Patent
Sarris

(10) Patent No.: US 6,170,697 B1
(45) Date of Patent: Jan. 9, 2001

(54) DISPENSER FOR COFFEE FILTERS

(76) Inventor: Christopher P. Sarris, 1106 Nicholson St., Joliet, IL (US) 60435

( * ) Notice: Under 35 U.S.C. 154(b), the term of this patent shall be extended for 0 days.

(21) Appl. No.: 09/151,441

(22) Filed: Sep. 11, 1998

(51) Int. Cl.$^7$ ....................................................... B65H 3/00
(52) U.S. Cl. ............................................. 221/36; 221/259
(58) Field of Search ................................ 221/36, 37, 259, 221/210, 213, 216, 255, 45, 42

(56) References Cited

U.S. PATENT DOCUMENTS 5,067,627 * 11/1991 Anderson ................................ 221/36
5,097,984 * 3/1992 Meisner et al. ...................... 221/210

* cited by examiner

Primary Examiner—Kenneth W. Noland
(74) Attorney, Agent, or Firm—Ernest Kettelson

(57) ABSTRACT

A dispenser to dispense the top item from the stack of such items, in particular the uppermost inverted cup type coffee filter from an inverted stack of such filters, comprises a housing in which to receive a stack of inverted cup type coffee filters, positioned on an upwardly biased telescoping shaft to position the top filter in the stack for contact by the dispensing mechanism. A slidable carrier member of the dispensing mechanism, normally biased to its forward position, has a pivotably mounted ejection member therein with elongated contact arms extending forwardly which are pivotable between a raised position and lowered position. When the carrier member is slidably moved rearwardly to its rear position, a rib projecting from the rear of the downwardly facing surface of the contact arms bears against the upturned bottom surface of the uppermost inverted coffee filter as it slides rearwardly thus causing the pivotably mounted ejection member to pivot in the direction of rotation which raises the forward portions of the contact arms out of frictional contact with the uppermost coffee filter until they pass to the rear thereof. At such time, the carrier member is released by the user whereupon the carrier member is biased forwardly in the direction toward it fully forward position. As it moves forward, the rib in contact with the upturned bottom surface of the top inverted coffee filter in the stack causes the ejection member to pivot in the opposite direction of rotation to thereby pivot the forward portions of the contact members downwardly in and through the respective receiving slots to frictionally contact and bear against the upturned bottom surface of the top coffee filter. As the carrier member moves forwardly, the contact members in frictional bearing contact with the upturned bottom surface of the top coffee filter first dislodge it from the stack and then move it forwardly away from the stack to dispense it out through the open front wall of the housing.

21 Claims, 18 Drawing Sheets

DISPENSER FOR COFFEE FILTERS

FIELD OF THE INVENTION

This invention relates to the field of devices which dispense the top item of a stack from the stack of such items. In particular, a preferred embodiment of the invention relates to dispensing the uppermost cup type coffee filter from an inverted stack of such coffee filters.

BACKGROUND OF THE INVENTION

Prior art devices of this kind of which the inventor is aware, include those disclosed in the following U.S. Patents:
No. 5,671,865 which is the inventor's own patent
No. 5,097,984
No. 5,067,627
No. 4,971,222
No. 4,805,801
No. 4,739,902
No. 4,674,635
No. 4,285,114
No. 4,269,324
No. 3,871,641
No. 3,124,268
No. 2,819,817
No. 2,478,815
No. 2,290,006
No. 1,719,451
No. 1,362,058
No. 416,340
The inventor is also aware of the device shown and described in Italian Patent No. 343,567. United States patents as well as foreign patents are available to those who are interested including the general public. Copies thereof can be obtained without difficulty.

SUMMARY OF THE INVENTION

The dispenser for coffee filters in accordance with this invention is an improvement over those known to the prior art. It includes a housing to receive an inverted stack of cup type coffee filters, wherein the cup of the lowest inverted coffee filter receives the bearing plate of a spring biased telescoping shaft which biases the stack upwardly toward the open upper wall of the housing.

A dispensing assembly is mounted on the open upper wall having a carrier slidably mounted thereon for sliding movement between a forward position and a rearward position. An ejecting member is pivotably mounted in the carrier, having a pivotable laterally extending rear wall and elongated contact members extending normal to and from the lower lateral edge of the lateral rear wall and forwardly from the rear wall. Pivot posts extend outwardly from both opposite sides of the lateral rear wall of the ejecting member at the level of its upper lateral edge to seat in apertures of the respective side walls of the carrier. When the rear wall of the ejection member pivots on such pivot posts in the direction of rotation that moves its lower lateral edge forward, the elongated contact members extending normal to and from the lower longitudinal edge as well as forwardly thereof are pivoted upwardly. When the rear wall of the ejection member then pivots in the opposite direction of rotation, its lower lateral edge moves rearward which causes the elongated contact members to pivot downwardly.

The dispensing assembly mounted on the open top wall of the housing includes a planar floor having longitudinally extending open receiving slots having width dimensions corresponding to but slightly larger than those of respective ones of the elongated contact members for reception through such slots for frictional contact with the uppermost inverted coffee filter of the stack received in the housing when the elongated contact members are pivoted downwardly.

The stack facing surface of the contact members have a planar layer of friction enhancing material thereon for enhanced frictional contact with the upturned bottom surface of the top coffee filter of the stack. The also have a projecting lateral rib along their laterally extending rear edge where they are integrally joined to the lower lateral edge of the pivotable rear wall of the ejecting member. Such rib projects outwardly from the stack facing surface of the contact members slightly farther than the plane of the layer of friction enhancing material. Thus, when the contact members are pivoted downwardly for contact with the upturned bottom surface of the facing coffee filter, the lateral rib comes into contact with the upturned bottom surface of the coffee filter before the layer of friction enhancing material.

When the carrier is slidingly moved rearward, the lateral rib in contact with the upturned bottom surface of the facing coffee filter causes the lower edge of the rear wall of the ejection member to pivot forwardly and the elongated members extending therefrom to pivot upwardly away from and out of contact with such facing coffee filter. Thus, the top coffee filter in the stack is not moved as the carrier is moved rearwardly. When the carrier then moves forwardly, the lateral projecting rib in contact with the upturned bottom surface of the top facing coffee filter in the stack causes the rear wall of the ejection member to pivot rearwardly and the elongated contact members to pivot and bear downwardly into pressured frictional contact with the upturned bottom surface of the top coffee filter in the stack. The lateral rib continues to exert such downward pressure of the contact members against the upturned bottom surface of the facing coffee filter as long as the carrier is moving forward and the rib is in contact with such upturned bottom surface of the filter. This pressurized frictional contact of the friction enhanced layers of material on the stack facing surfaces of the elongated contact members is sufficient to dislodge the uppermost coffee filter from the stack and to thereafter move it forwardly and out through the open front wall of the housing as the carrier moves to its full forward position.

The carrier is normally biased to its full forward position by a pair of coil springs connected along each side thereof.

DESCRIPTION OF PREFERRED EMBODIMENT

Figure 1:
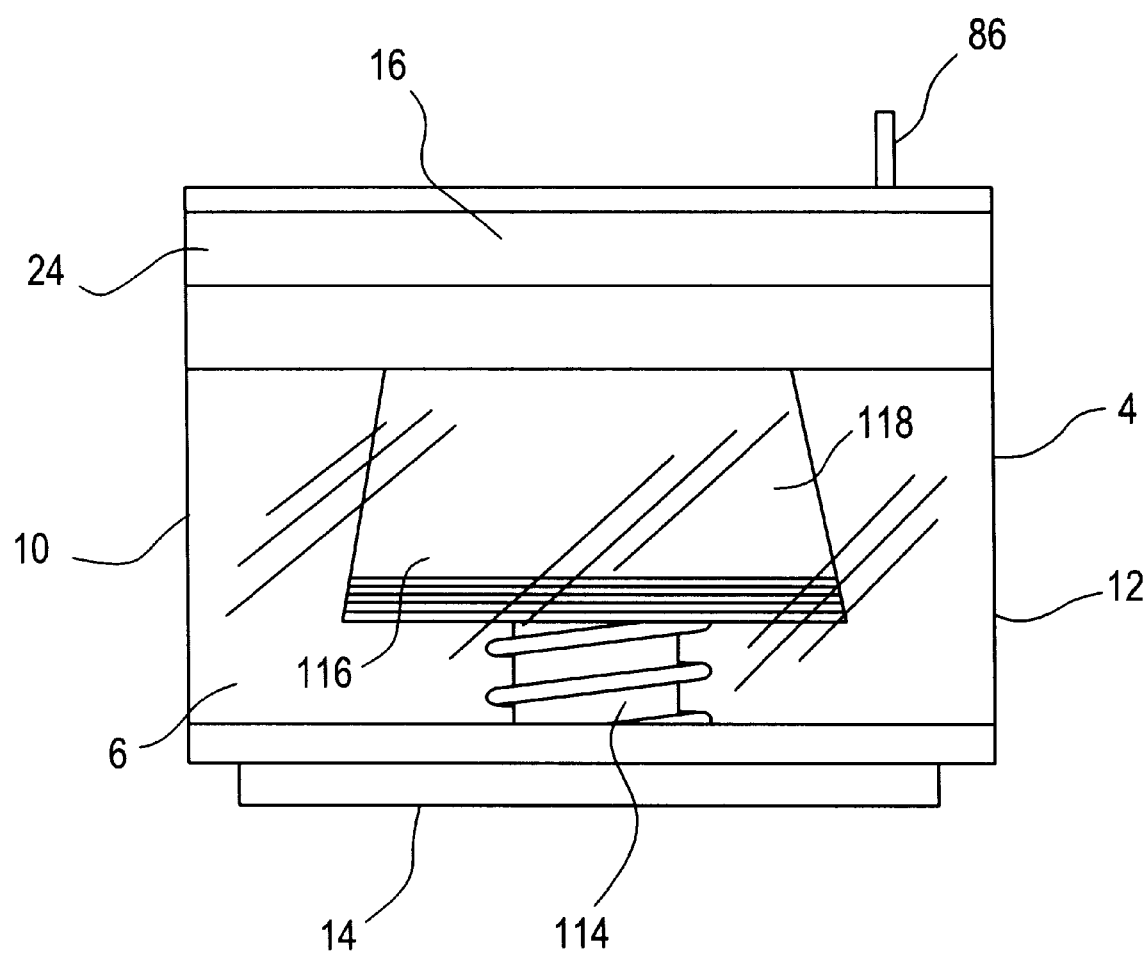
FIG. 1 is a side elevation view of a coffee filter dispenser in accordance with this invention.
Figure 2:
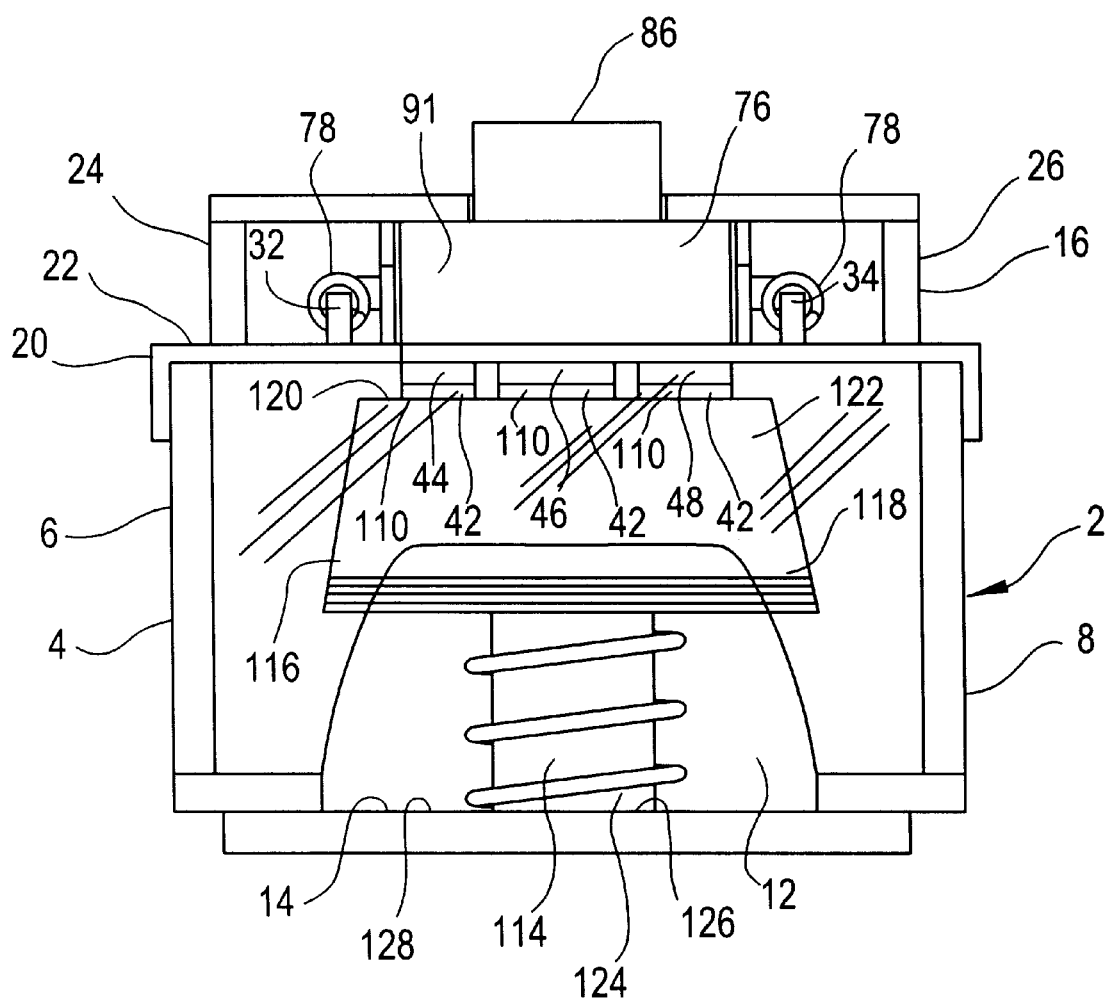
FIG. 2 is a front elevation view of the coffee filter dispenser shown in FIG. 1.
Figure 3:
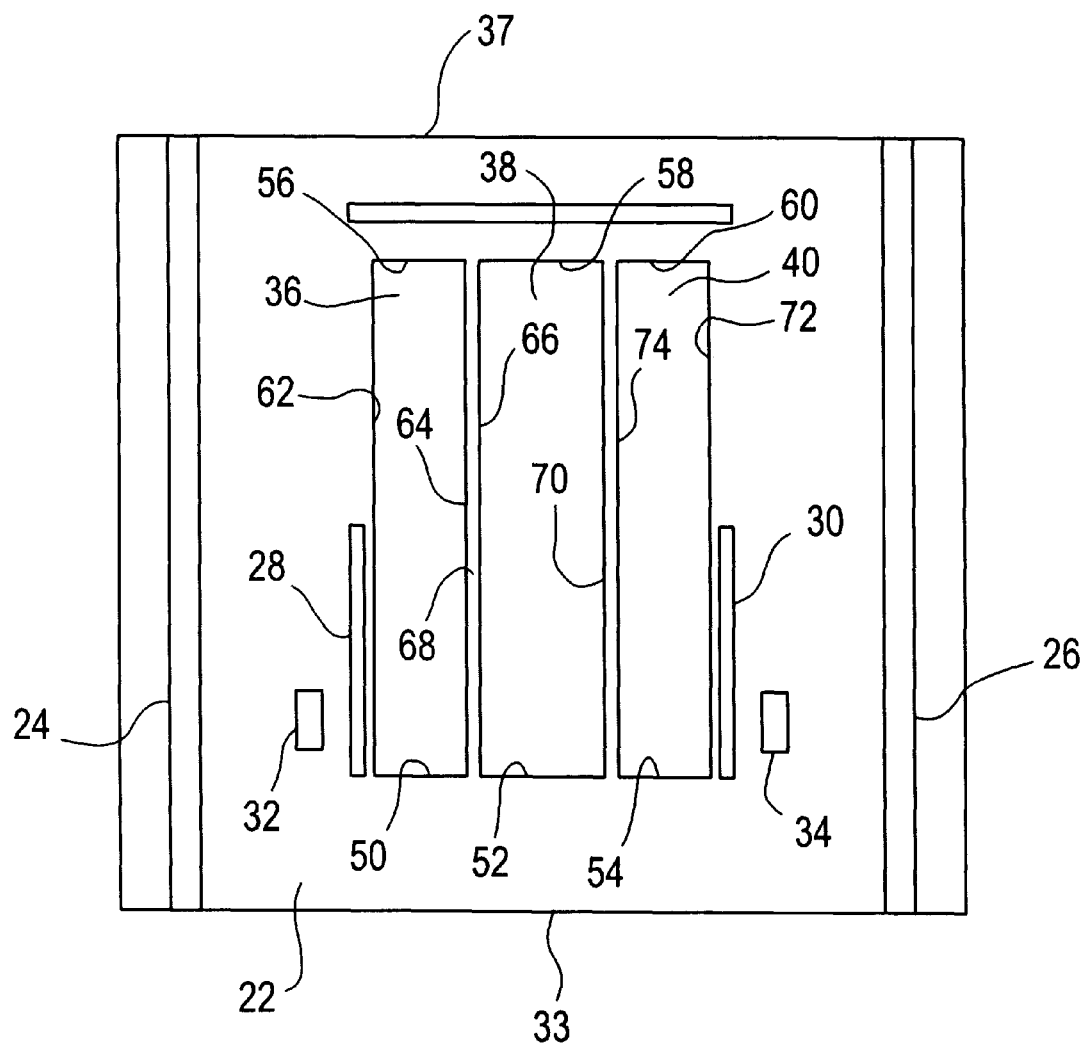
FIG. 3 is a top plan view of the floor of the ejection assembly of the coffee filter dispenser shown in FIGS. 1 and 2.
Figure 4:
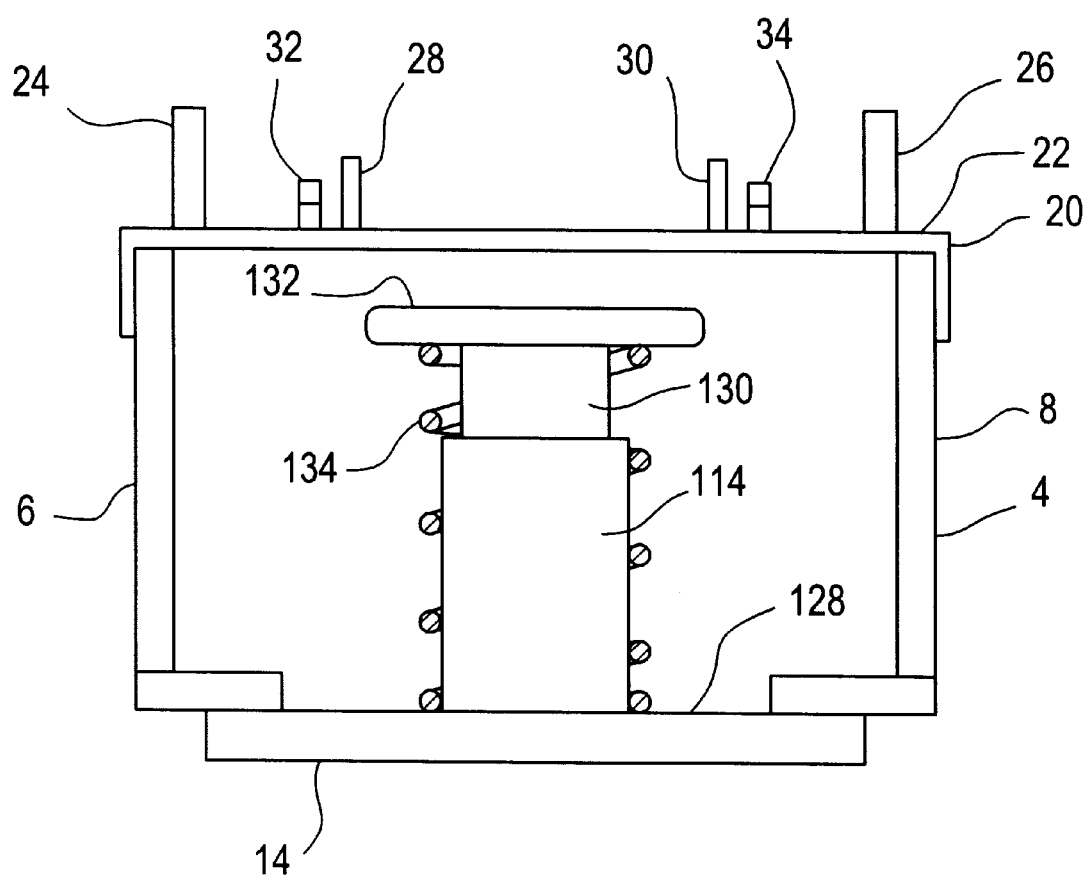
FIG. 4 is a front elevation view of the coffee filter dispenser shown in FIG. 2 but with the front transparent wall removed, the stack of filters removed from the spring biased telescoping lift member that urges the stack upwardly into position for contact by the contact arms of the ejection assembly, and the slidable carrier member plus top cover are also removed from the ejection assembly.
Figure 5:
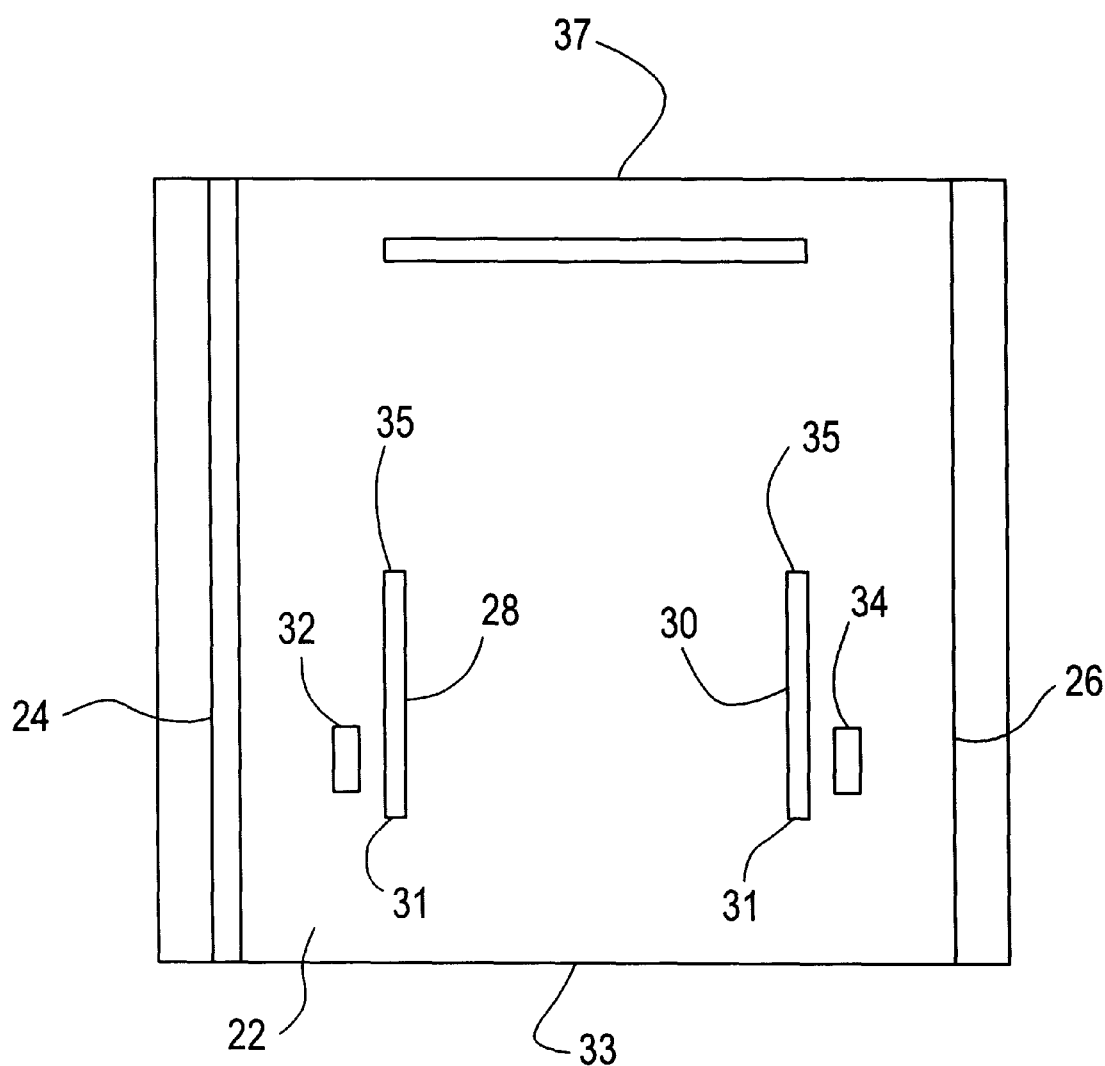
FIG. 5 is a top plan view of the floor of the ejection assembly before an opening or openings are cut therein for the contact arms of the ejection assembly to extend through for contact with the coffee filter stack below.
Figure 6:
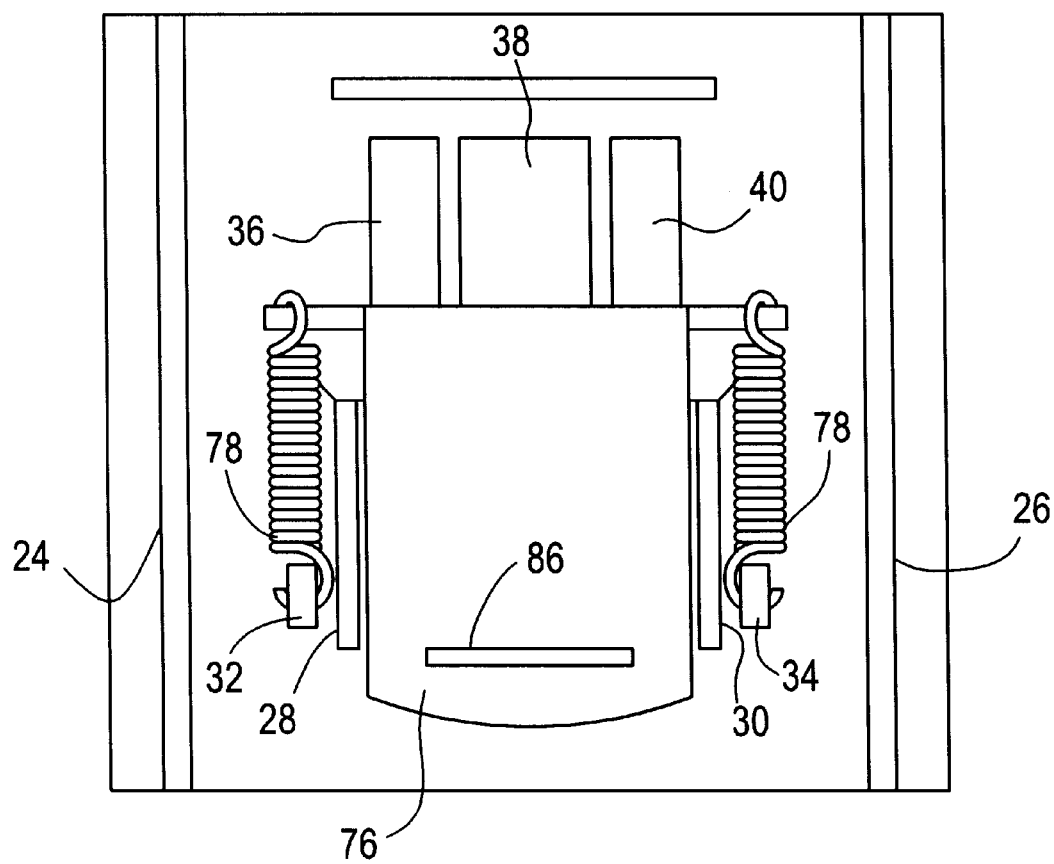
FIG. 6 is a top plan view of the ejection assembly showing the slidable carrier in its normally biased forward position.
Figure 7:
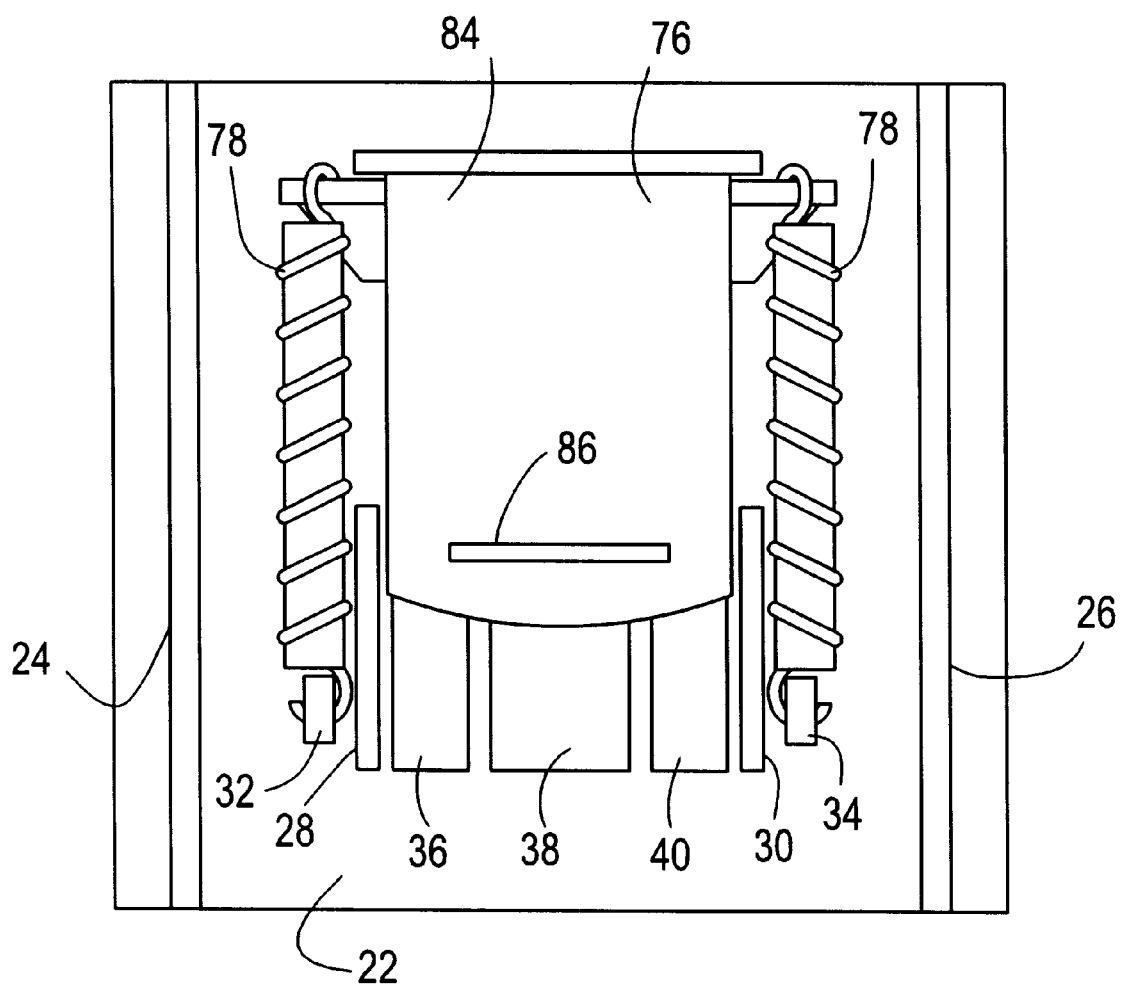
FIG. 7 is a top plan view of the ejection assembly shown in FIG. 6 but with the slidable carrier moved against the bias of the springs to its rearward position.
Figure 8:
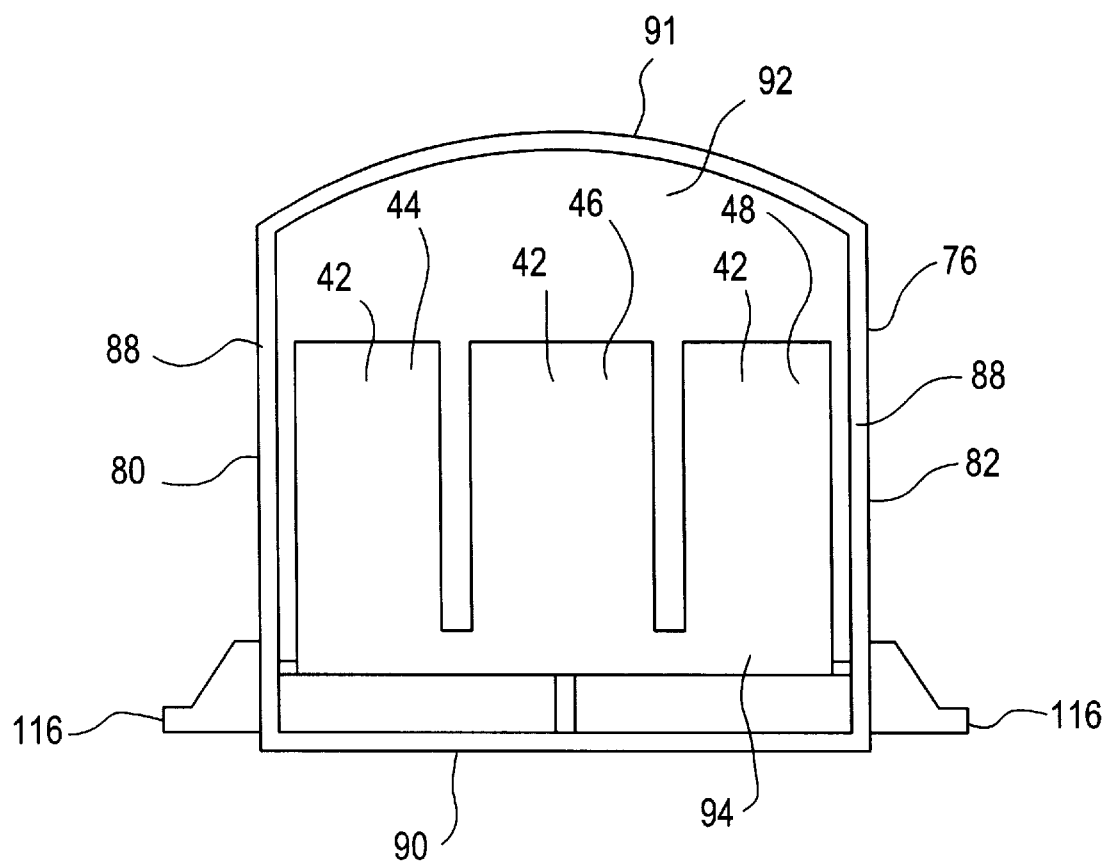
FIG. 8 is an enlarged bottom plan view of the carrier of the ejection assembly.
Figure 9:
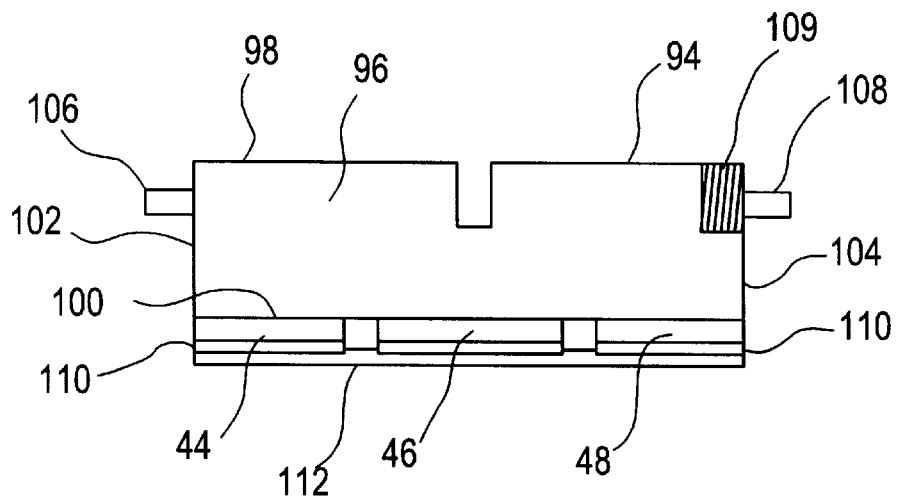
FIG. 9 is a front end view of the pivotable contact arm member which is pivotally mounted in the carrier.
Figure 10:
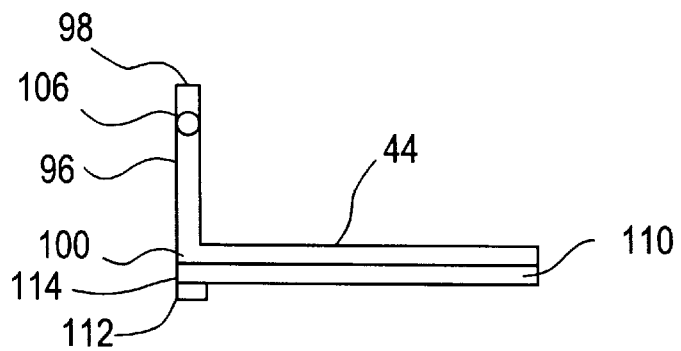
FIG. 10 is a side elevation view of one embodiment of the pivotable contact arm member showing an adhesive strip at the rearwardly facing end of the downwardly facing surface of the longitudinally extending contact arms, such adhesive strip extending laterally across the rear portion of the contact arm member.
Figure 11:
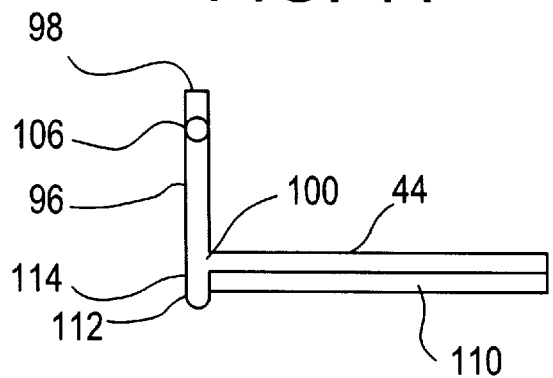
FIG. 11 is a side elevation view of another embodiment of the pivotable contact arm member showing an integrally formed rib at the rearwardly facing end of the downwardly facing surface of the longitudinally extending contact arms, such integrally formed rib extending laterally across the rear portion of the contact arm member.
Figure 12:
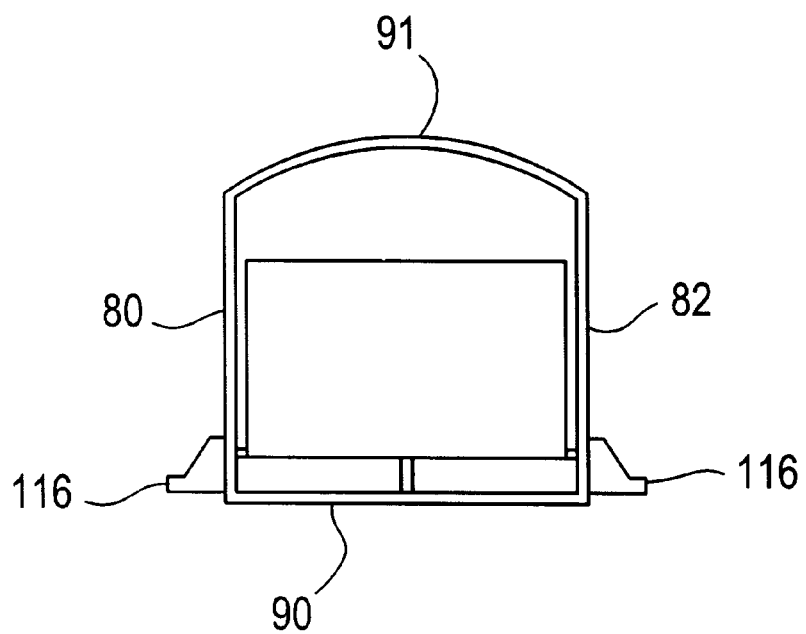
FIG. 12 is a bottom plan view of a modified carrier for a modified ejection assembly in accordance with this invention.
Figure 13:
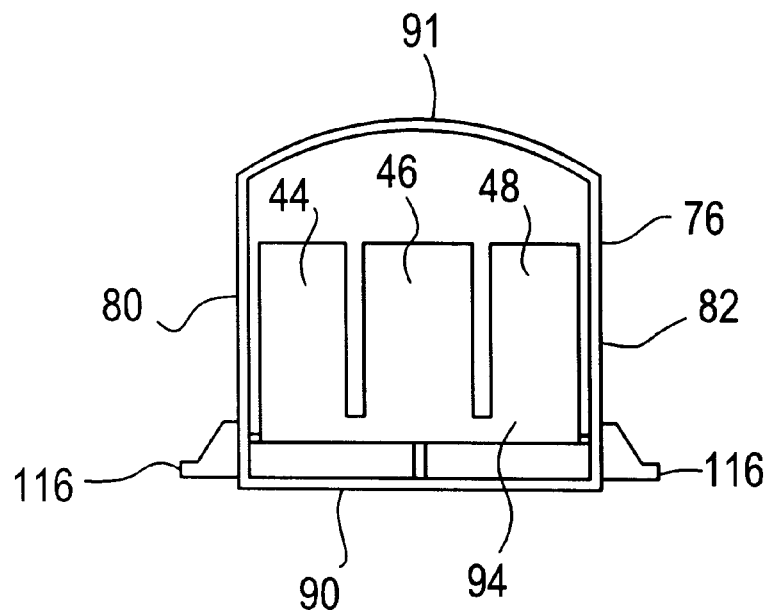
FIG. 13 is a bottom plan view of a carrier for the ejection assembly shown in FIG. 3.
Figure 14:
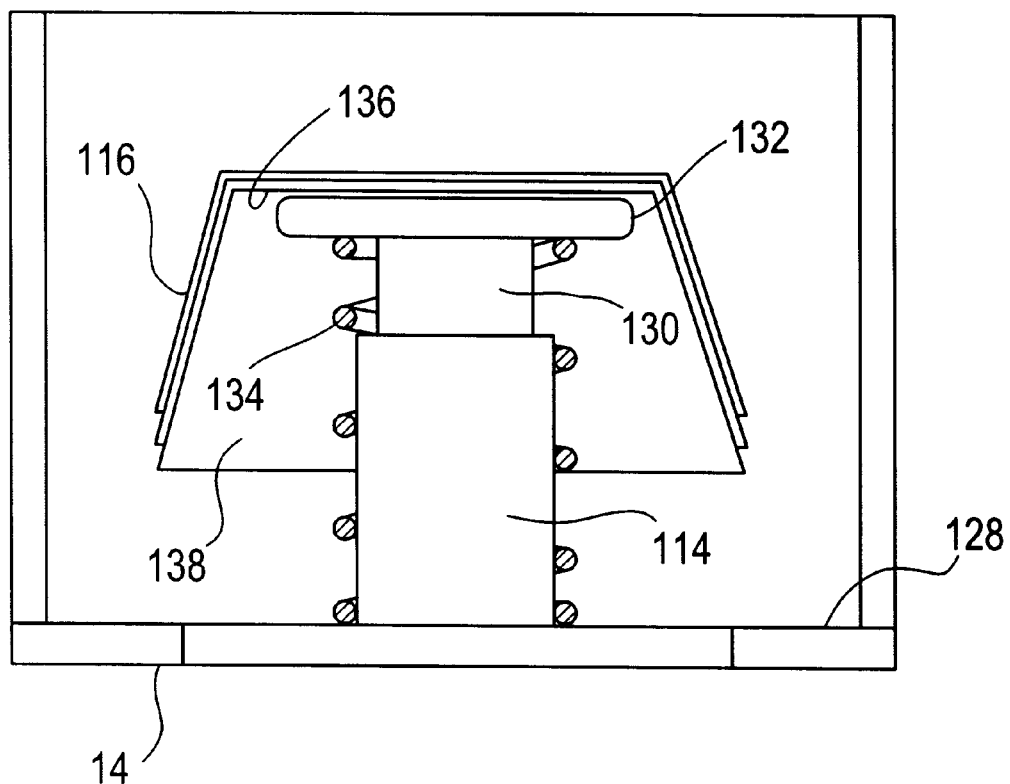
FIG. 14 is a front elevation view of the housing of the coffee filter dispenser in accordance with this invention with the ejection assembly removed from the top and with the front transparent wall and stack of coffee filters also removed to illustrate the spring biased telescoping lift member that urges the stack of filters upwardly.
Figure 15:
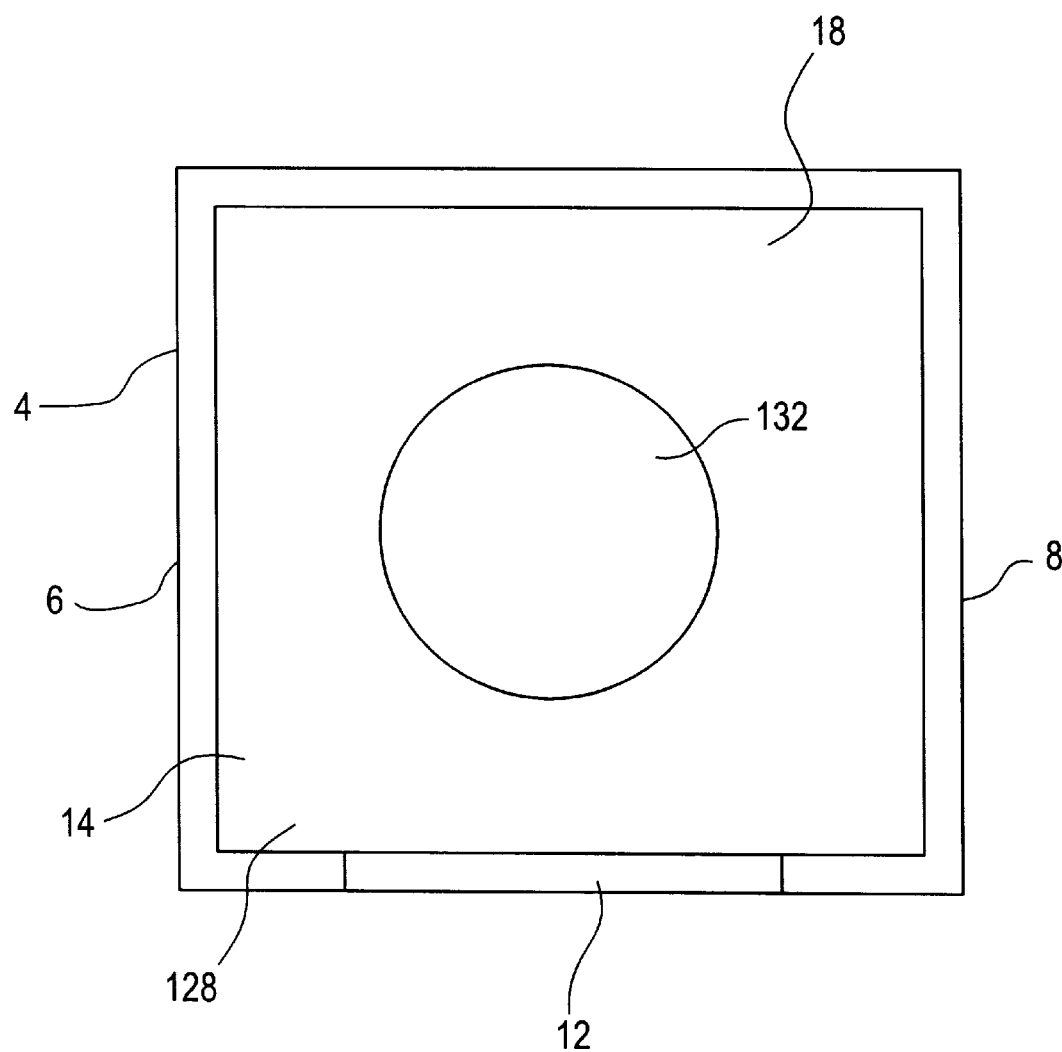
FIG. 15 is a top plan view of the housing and telescoping lift member shown in FIG. 14.

A dispenser 2 for coffee filters in accordance with this invention comprises a housing 4 having a first side wall 6, a second opposite side wall 8, a rear wall 10, an open front wall 12 and a bottom wall 14.

An ejection assembly 16 is secured to the housing 4 above the open top wall 18. The ejection assembly 16 includes a base member 20 having a planar floor 22 which spans and covers the open top wall 18 of the housing 4, a first relatively short side wall 24 which extends upwardly from the floor along one side and a second relatively short side wall 26 which extends upwardly from the floor along the other side.

A first guide rail 28 extends upwardly from the floor 22 spaced apart inwardly a short distance, about an inch, from and parallel to the first ejection assembly side wall 24. A second guide rail 30 extends upwardly from the floor 22 spaced apart inwardly a short distance, about an inch, from and parallel to the second ejection assembly side wall 26. Each guide rail extends longitudinally a limited distance of about three to four inches, terminating forwardly in a first end 31 which is spaced apart rearwardly from the forwardly facing end 33 of the floor 22 about one and a half to two inches, and terminating rearwardly in a second end 35 which is spaced apart forwardly from the rearwardly facing end 37 of the floor 22 about five to six inches.

A first anchor lug 32 extends upwardly from the floor 22 between the first ejection assembly side wall 24 and the first guide rail 28 closely adjacent to the guide rail 28. A second anchor lug 34 extends upwardly from the floor 22 between the second ejection assembly side wall 26 and the second guide rail 30 closely adjacent to the second guide rail 30. Each anchor lug 32 and 34 is positioned about three inches rearwardly from the forwardly facing end 34 of the ejection assembly floor 22 and about eight to nine inches forwardly from the rearwardly facing end 38 thereof.

Three elongated receiving slots 36, 38 and 40 are provided through the ejection assembly floor 22 to receive the friction enhanced planar contact faces 42 of respective operating contact members 44, 46 and 48 when pivoted to the ejecting position. The receiving slots extend longitudinally from respective first slot ends 50, 52 and 54 which are spaced apart rearwardly from the forwardly facing end 33 of the floor 22 about three to three and a half inches to respective second slot ends 56, 58 and 60 which are spaced apart forwardly from the rearwardly facing end 37 of the floor 22 about one and a half to two inches. The elongated receiving slots extend longitudinally of the floor 22 about six to seven inches between their respective first and second slot ends.

The outer longitudinal edge 62 of elongated receiving slot 36 is parallel to and spaced apart inwardly from the first ejection assembly side wall 24 about one and a half to two inches. The opposite inner longitudinal edge 64 of slot 36 is parallel to and spaced apart from the outer longitudinal edge 62 about an inch, leaving a lateral opening for slot 36 of about one inch. The longitudinal opening of slot 36 is about six to seven inches.

Receiving slot 38 is about two to two and a half inches wide between its first longitudinal edge 66 adjacent to and separated from inner longitudinal edge 64 of slot 36, to which it is parallel, by a first longitudinal rib 68 about a half to three-quarters of an inch wide formed in the floor 22. The opposite longitudinal edge 70 of slot 38 is parallel to and spaced apart from its first longitudinal rib 68 about two to two and a half inches, leaving a lateral opening for slot 38 of about two to two and a half inches. The longitudinal opening of slot 38 is about six to seven inches.

Receiving slot 40 has an outer longitudinal edge 72 which is parallel to and spaced apart inwardly from the second ejection assembly side wall 26 about one and a half to two inches. The opposite inner longitudinal edge 74 of slot 40 is parallel to and spaced apart from the outer longitudinal edge 72 about an inch, leaving a lateral opening for slot 40 of about one inch. The longitudinal opening of slot 40 is about six to seven inches.

The ejection assembly 16 includes an operating member 76 mounted on the ejection assembly floor 22 for sliding movement between a forward retracted position, rearward against the bias of coil springs 78 and then back forward under bias of the springs 78 during the ejecting operation. The operating member 76 includes vertically extending side walls 80 and 82 about an inch and a half to two inches high, spaced apart about six to seven inches, a solid top wall 84 and an open bottom wall. An operating handle 86 extends upwardly from the top wall 84 near its forwardly facing end. The side walls 80 and 82 each have a smooth, flat bottom edge 88 to slide along the smooth flat surface of the ejection assembly floor 22, when the operating member 76 is in position thereon. The outwardly facing surface of side wall 80 is in abutting and slidable engagement against the inwardly facing surface of guide rail 28. The outwardly facing surface of side wall 82 is in abutting and slidable engagement against the inwardly facing surface of guide rail 30.

The operating member 76 includes a rearwardly facing end wall 90, and a forwardly facing end wall 91, defining a cavity 92 therebetween bounded by side walls 80 and 82, top wall 84, the rearwardly facing end wall 90, and forwardly facing end wall 91. A frictional contact assembly 94, which includes operating contact members 44, 46 and 48 with friction enhanced contact faces 42 thereon, is pivotably mounted in the cavity 92 for pivotal movement between a raised position when operating member 76 is drawn rearwardly against the bias of springs 78 and a lowered position when operating member 76 is released to move forwardly under the bias of springs 78.

The pivotably mounted frictional contact assembly 94 comprises a laterally extending rear wall 96 having an upper lateral edge 98 and a lower lateral edge 100, a first side edge 102 adjacent to side wall 80 of operating member 76 when in place, and a second side edge 104 adjacent to side wall 82 of operating member 76 when in place. A first pivot post 106 extends laterally from the upper lateral edge 98 and outwardly from the first side edge 102 of the rear wall 96 of the pivotably mounted contact assembly 94. A second pivot post 108 extends laterally from the upper lateral edge 98 and outwardly from the second side edge 104 of the rear wall 96 of the pivotably mounted contact assembly 94. The pivot post 106 seats in a receiving aperture in side wall 80 of operating member 76 and the pivot post 108 seats in a receiving aperture in side wall 82 of operating member 76. A coil spring 109 extends around the pivot post 108, having one end positioned to normally bias the contact assembly 94 downwardly and its opposite end secured to an adjacent portion of the carrier wall 82.

The operating contact members 44, 46 and 48 of the pivotably mounted contact assembly 94 extend forwardly about two to two and a half inches from the lower lateral edge 100 of the rear wall 96 thereof at a ninety degree angle thereto. When the operating member 76 and pivotably mounted contact assembly 94 are in place on the floor 22 of the ejection assembly 16, contact member 44 is in registration with receiving slot 36, contact member 46 is in registration with receiving slot 38 and contact member 48 is in registration with receiving slot 40. The friction enhanced planar contact faces 42 of each contact member comprise a planar strip of friction enhancing material 110 such as rubber or a synthetic material having the friction enhancing characteristics of rubber secured to the downwardly facing surfaces of respective ones of the contact members 44, 46 and 48.

Operating contact member 44 has a lateral dimension slightly less than that of receiving slot 36 for longitudinally slidable reception therein and extension therethrough of its friction enhancing contact surface 42. Operating contact member 46 has a lateral dimension slightly less than that of receiving slot 38 for longitudinally slidable reception therein and extension therethrough of its friction enhancing contact surface 42. Operating contact member 48 has a lateral dimension slightly less than that of receiving slot 40 for longitudinally slidable reception therein and extension therethrough of its friction enhancing contact surface 42.

A thin lateral projecting rib or strip 112, preferably slightly adhesive or friction enhanced, is provided to extend laterally across the downwardly facing surface of each contact member 44, 46 and 48 adjacent the rearwardly facing ends 114 thereof, and it projects outwardly a short distance from the plane of the friction enhancing material 110 on the downwardly facing contact surface 42 of each operating contact member. The laterally extending strip or rib 112 adjacent to the rearwardly facing end of the contact members and projecting outwardly and downwardly therefrom beyond the plane of the downwardly facing contact surface 42 may also be an integrally formed rib, integrally formed as an outward and downward lateral projection of the contact members and adjacent the lower lateral edge 100 of the rear wall 96 of the pivotably mounted contact assembly 94. In such case, the integrally formed lateral rib has to project outwardly from the plane of the friction enhancing strip 110 and of the downwardly facing contact surface 42 far enough to make good frictional contact with the facing surface portion of the top coffee filter in a stack received in the housing 4 and in place below the operating member 76 and the pivotably mounted contact assembly 94 carried thereby.

Connecting ear members 116 extend outwardly from the respective side walls 80 and 82 of the operating member 76 near the rear end wall 90, for connection thereto of one end of the coil springs 78. The other end of the springs 78 is connected to the connecting lugs 32 and 34. When the operating member 76 is in the forward position, the springs are relatively relaxed and retracted. The pivotably mounted contact assembly 94 is pivoted to its downward position with the contact members 44, 46 and 48 received in their corresponding receiving slots 36, 38 and 40, with the friction enhanced contact surfaces 42 of each contact member extending through the respective slots to rest against the bottom of the top inverted filter of an inverted stack of cup type coffee filters in place within the housing 4. When the operating member 76 is drawn rearwardly against the bias of the springs 78, the thin slightly adhesive or friction enhanced strips or ribs 112 on the rear downwardly facing contact surfaces 42 of the contact members 44, 46 and 48 adhere sufficiently to or bear sufficiently against the bottom wall of the inverted coffee filter they are resting on to initially hold the rear wall 96 of the pivotably mounted contact assembly 94 from rearward movement as the operating member 76 is moved rearwardly. This causes the rear wall 96 to pivot on the pivot posts 106 and 108 located at the upper laterally extending edge thereof, which swivels the lower lateral edge and the contact members 44, 46 and 48 upwardly. This lessens the drag or hold of the thin friction enhanced strips or integrally formed ribs 112 on the upturned bottom wall of the uppermost inverted coffee filter so they can slide therealong without moving such coffee filter, but the strips or ribs 112 remain in sufficient contact with the bottom surface of the inverted coffee filter to hold the remaining portions of the contact surfaces 42 and their layers 110 of friction enhancing material pivoted upwardly and out of contact with such coffee filter as the operating member 76 is drawn rearwardly to its fully drawn back position. At such time, the operating member 76 is released, whereupon the springs 78 bias the operating member 76 and its pivotably mounted contact assembly 94 forwardly. The friction enhanced strips or integrally formed ribs 112 in contact with the bottom surface of the inverted coffee filter then pivot the rear wall 96 rearwardly as the operating member 76 moves forwardly. The contact members 44, 46 and 48 are then pivoted downwardly into full friction engagement of their friction enhanced contact surfaces 42 and layers 110 of friction enhanced material with the upturned bottom surface of the inverted coffee filter which is at the top of the inverted stack of cup type coffee filters. As the operating member continues forward under bias of the springs 78 to its fully forward position, the layers 110 of friction enhanced material on the contact surfaces 42 of the contact members 44, 46 and 48 frictionally contact, slide and move the top coffee filter off from the stack and eject it out through the front open wall 12 of the housing 4.

A spring biased telescoping shaft 114 biases the inverted stack 116 of cup type coffee filters 118 upwardly into position for contact of the bottom surface 120 of the top inverted filter 122 by the contact surfaces 42 of the contact members 44, 46 and 48. The telescoping shaft 114 comprises a first tubular shaft member 124 having its lower end 126 secured to the upwardly facing surface 128 of the bottom wall 14 of the housing 4. An insert shaft portion 130 is received in the passageway of the first tubular shaft member 124. The insert shaft portion 130 includes a bearing plate member 132 at its upper end. A coil spring 134 is provided around the telescoping shaft 114, one end of which bears against the surface 128 of the bottom wall 14 of the housing 4 and the other end bears against the downwardly facing surface of the bearing plate member 132 to bias it upwardly. The cup portion 136 of the bottom filter 138 of the stack 116 of inverted cup type coffee filters is positioned to receive the bearing plate member 132 therein, whereupon the spring biased telescoping shaft 114 is forced downwardly far enough to insert the stack 116 into the housing 4 with its top coffee filter positioned in place below the receiving slots 36, 38 and 40 in the floor 22 of the ejecting assembly and below the respective contact surfaces 42 of the respective operating contact members 44, 46 and 48.

Figure 16:
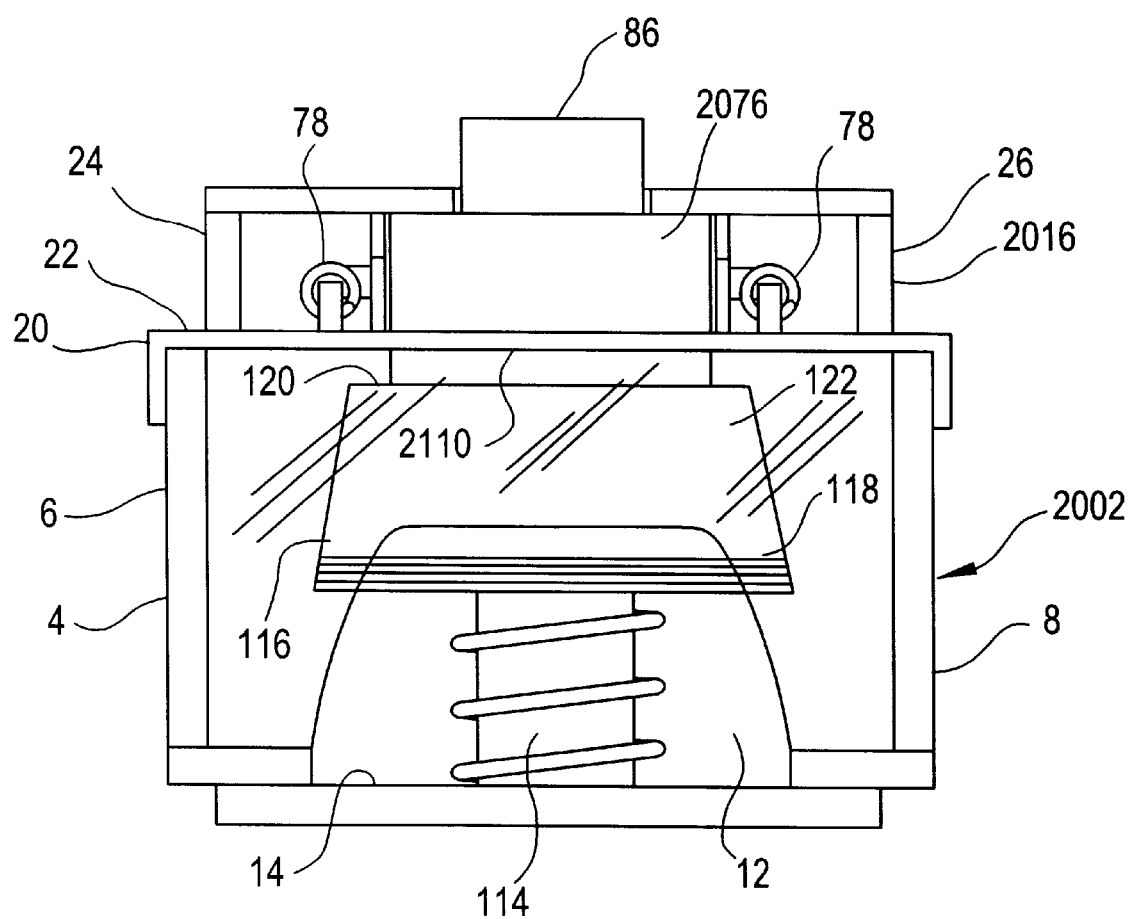
FIG. 16 is a front elevation view of a modified coffee filter dispenser in accordance with this invention having a modified ejection assembly in which the pivotable contact arm member includes only one contact arm rather than a plurality of contact arms as shown for example in FIG. 2.
Figure 17:
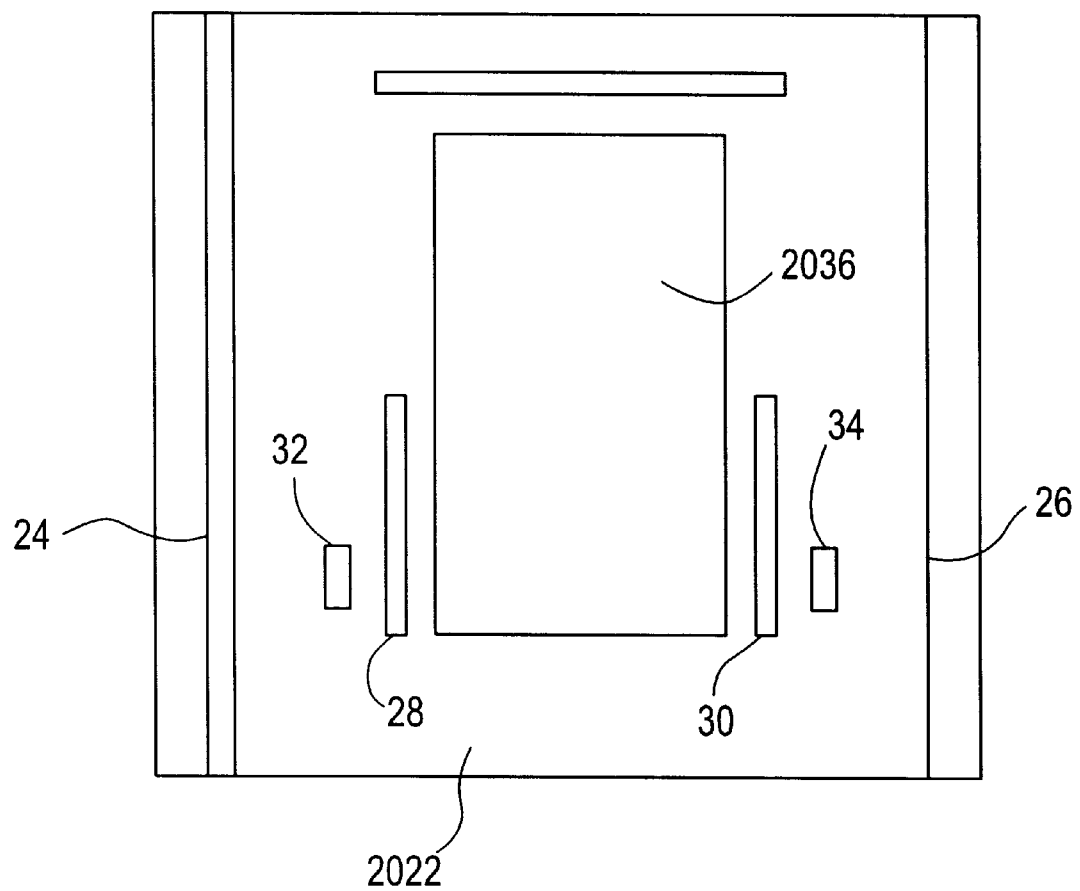
FIG. 17 is a top plan view of the floor of the modified ejection assembly for use with the modified coffee filter dispenser shown in FIG. 16.
Figure 18:
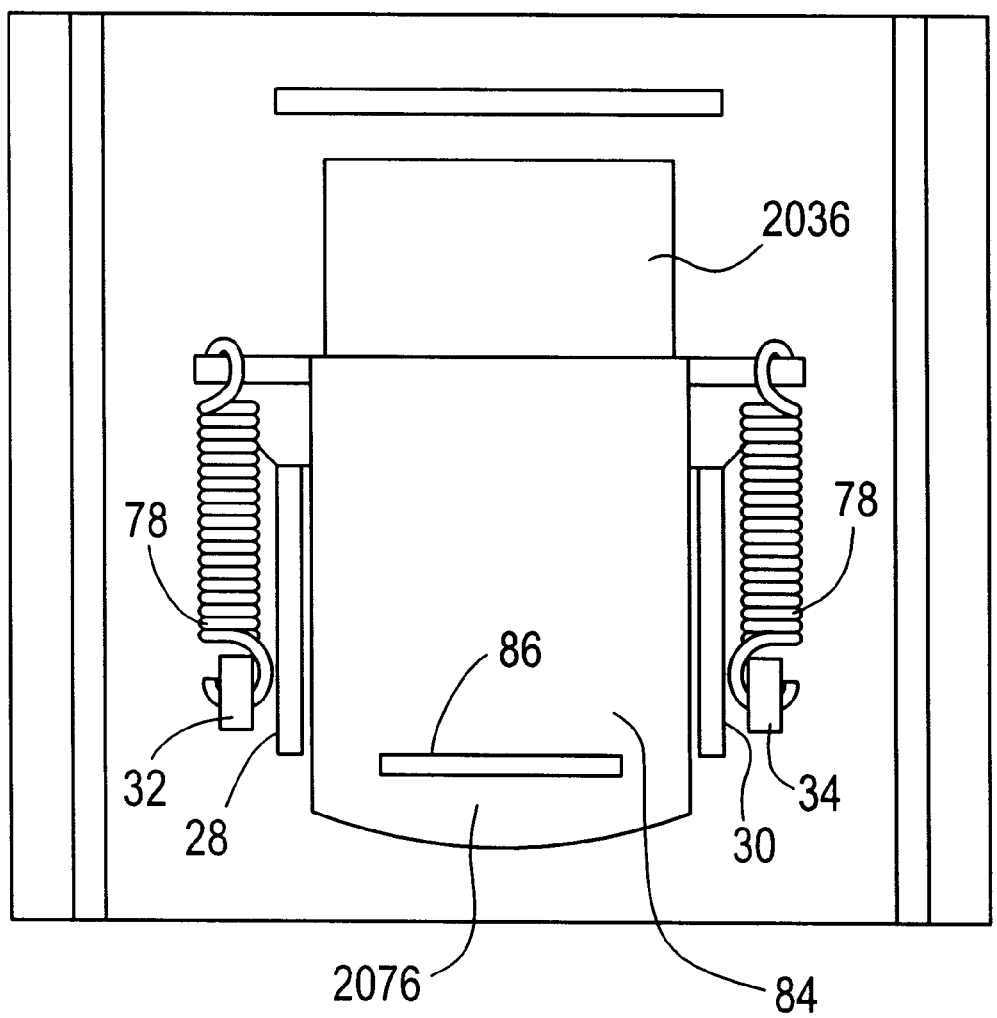
FIG. 18 is a top plan view of the modified ejection assembly for use with the coffee filter dispenser shown in FIG. 16, shown with the carrier in its forward position.
Figure 19:
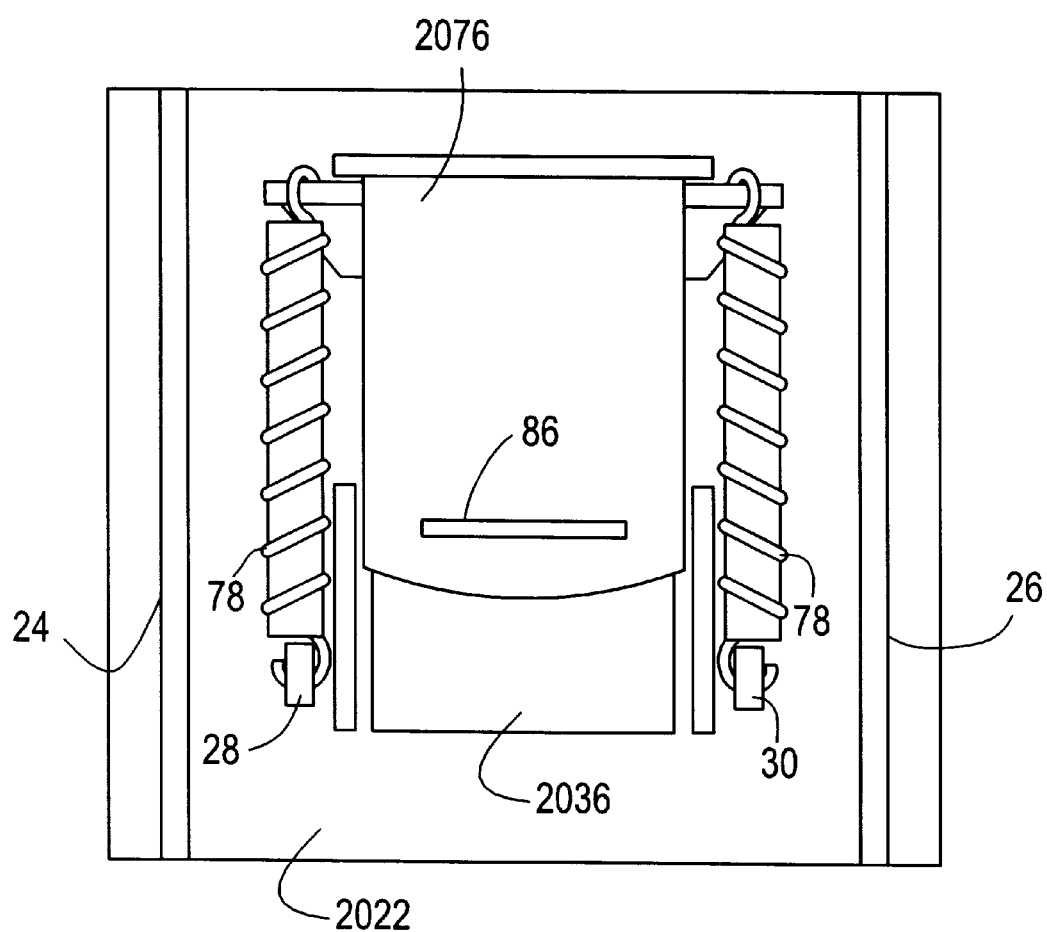
FIG. 19 is a top plan view of the modified ejection assembly for use with the coffee filter dispenser shown in FIG. 16, shown with the carrier moved against the bias of the springs to its rearward position.
Figure 20:
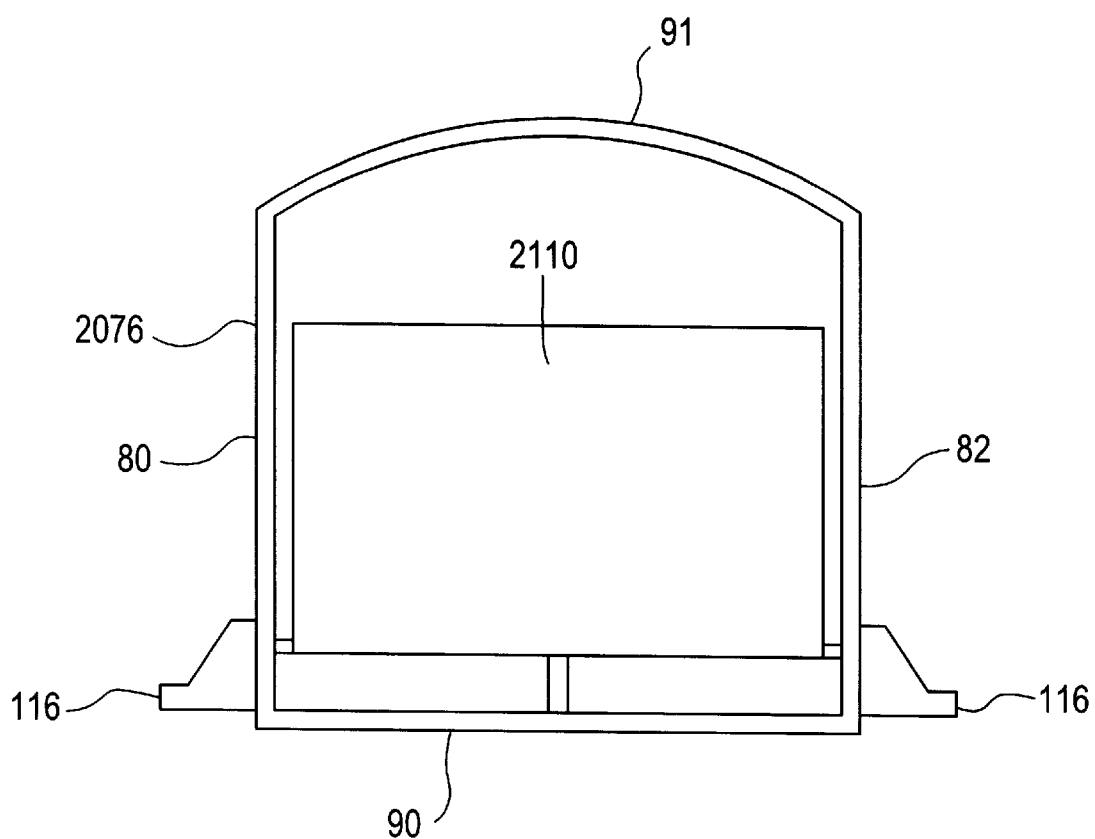
FIG. 20 is an enlarged bottom plan view of a modified carrier for use with a modified coffee filter dispenser as shown in FIG. 16.
Figure 21:
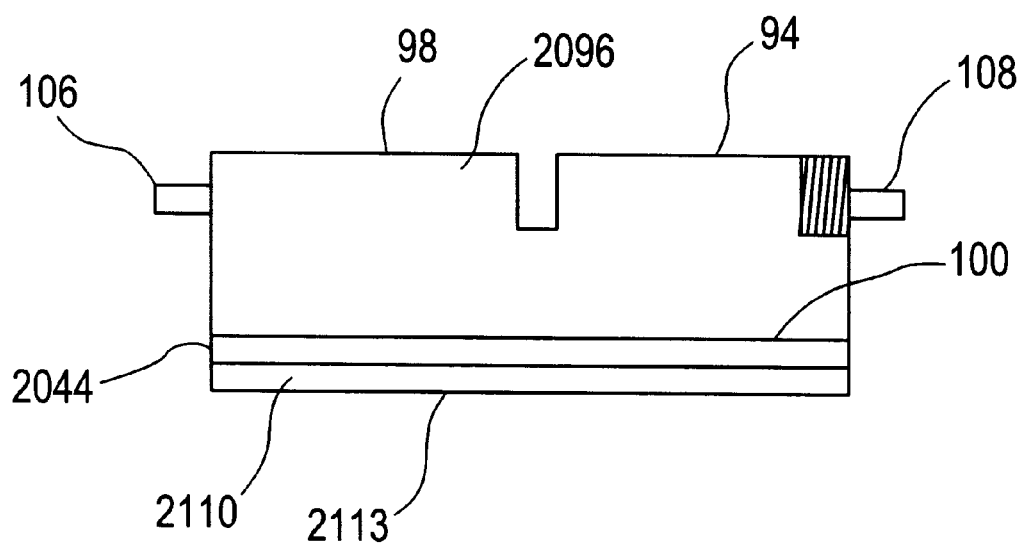
FIG. 21 is a front elevation view of a modified pivotable contact arm member for use with a modified carrier as shown in FIG. 20.
Figure 22:
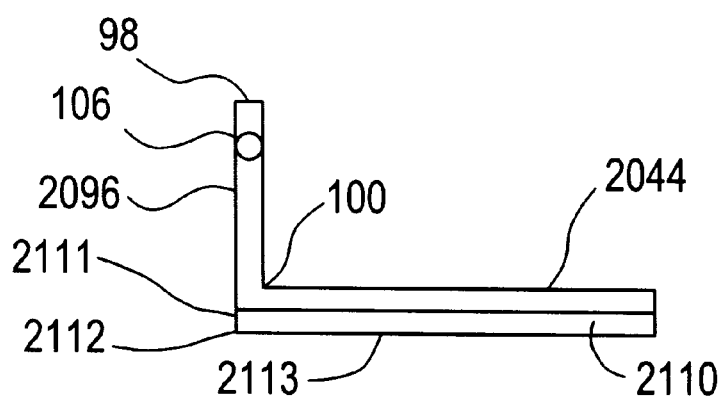
FIG. 22 is a side elevation view of the modified pivotable contact arm member shown in FIG. 21.

FIGS. 16 through 21 show a modified coffee filter dispenser 2002 in accordance with this invention. Instead of a pivotable contact arm member 96 having a plurality of contact arms 44, 46 and 48 mounted in the slidable carrier 76, its pivotable contact arm member 2096 pivotally mounted in the modified carrier 2076 has only one contact arm 2044 which has a relatively thicker strip 2110 of friction enhancing material.

The modified floor 2022 of the modified ejection assembly 2016 has only one large opening or receiving slot 2036 to receive the single contact arm 2044 of this modification.

In this modification, the relatively thick strip or block 2110 of friction enhancing material has a rearwardly facing end wall 2111 which terminates downwardly in a relatively sharp edge 2112 where it joins the longitudinal downwardly facing contact wall 2113 at a ninety degree angle. This sharp lower edge 2112 extends laterally across the single contact arm 2044. When the modified carrier 2076 is slidingly moved toward its rearward position, the sharp corner edge 2112 frictionally engages the upturned surface of the top inverted coffee filter in the stack which causes the lower portion of the modified pivotable contact arm member 2096 to begin to rotate in the forward direction of rotation as the carrier 2076 is moved rearwardly. This pivots the single contact arm 2044 upwardly so it is otherwise out of contact with the upturned surface of the top inverted coffee filter in the stack except for the very small portion represented by the sharp ninety degree corner thereof at the rear of the block 2110 of friction enhancing material.

In this modified form of the invention, an integrally formed rib or adhesive strip 112 is not needed.

I claim:

1. A dispensing device for dispensing an uppermost item from the top of a stack of such items, comprising movable ejection means movable between a raised position above said stack and a lowered position for dispensing said uppermost item from the top of said stack, raising means to move said ejection means to said raised position without moving said uppermost item, and dispensing means to dispense said uppermost item from the top of said stack when said ejection means is lowered to and remains in said lowered position until said uppermost item is dispensed.

2. A dispensing device for dispensing an uppermost item from the top of a stack of such items as set forth in claim 1, wherein said stack comprises a plurality of inverted cup type coffee filters in nested relationship, and said uppermost item comprises one of said inverted cup type coffee filters.

3. A dispensing device for dispensing an uppermost item from the top of a stack of such items as set forth in claim 1, including a housing to receive said stack, said housing having an upper wall, said movable ejection means being positioned above said upper wall of said housing, and stack biasing means to bias said stack toward said upper wall and said movable ejection means.

4. A dispensing device for dispensing an uppermost item from the top of a stack of such items as set forth in claim 1, wherein said ejection means includes a contact arm movable into registration with said stack having a stack facing surface.

5. A dispensing device for dispensing an uppermost item from the top of a stack of such items as set forth in claim 1, wherein said ejection means includes a contact arm movable into registration with said stack having a stack facing surface, said stack facing surface having friction enhancing material thereon.

6. A dispensing device for dispensing an uppermost item from the top of a stack of such items, comprising movable ejection means movable between a raised position above said stack and a lowered position for dispensing said uppermost item from the top of said stack, raising means to move said ejection means to said raised position without moving said uppermost item, and dispensing means to dispense said uppermost item from the top of said stack when said ejection means is lowered to and remains in said lowered position until said uppermost item is dispensed, including a housing to receive said stack, said housing having an upper wall, said movable ejection means being positioned above said upper wall of said housing, and stack biasing means to bias said stack toward said upper wall and said movable ejection means, wherein said dispensing means includes a carrier member positioned above said upper wall of said housing being slidable between a first position and a second position, said ejection means being carried by said carrier member, said ejection means being in said lowered position when said carrier member is moved toward and in said first position and in said raised position when said carrier member is moved toward said second position.

7. A dispensing device for dispensing an uppermost item from the top of a stack of such items, comprising movable ejection means movable between a raised position above said stack and a lowered position for dispensing said uppermost item from the top of said stack, raising means to move said ejection means to said raised position without moving said uppermost item, and dispensing means to dispense said uppermost item from the top of said stack when said ejection means is lowered to and remains in said lowered position until said uppermost item is dispensed, wherein said ejection means includes a contact arm movable into registration with said stack having a stack facing surface, said stack facing surface having friction enhancing material thereon, wherein said dispensing means includes a carrier member positioned above said upper wall of said housing being slidable between a first position and a second position, said ejection means being carried by said carrier member, said ejection means being in said lowered position when said carrier member is moved toward and in said first position and in said raised position when said carrier member is moved toward said second position, and biasing means to bias and slide said carrier member from said second position toward said first position thereby moving said ejection means to said lowered position.

8. A dispensing device for dispensing an uppermost item from the top of a stack of such items as set forth in claim 7, wherein said ejection means includes a laterally extending rear wall terminating at one side in a first side edge and at the opposite side in a second side edge, having an upper lateral edge and a lower lateral edge extending between said first and second side edges, said contact arm extending from said lower lateral edge of said laterally extending rear wall and substantially normal thereto along a lateral integrally formed juncture line, a first pivot member extending laterally outwardly from said first side edge of said laterally extending rear wall adjacent said upper lateral edge thereof for reception in a facing side wall aperture of said carrier member, a second pivot member extending laterally outwardly from said second side edge of said laterally extending rear wall adjacent said upper lateral edge thereof for reception in a facing side wall aperture of said carrier member, said raising means includes a projecting member which projects outwardly from said stack facing surface of said contact arm at a location near said lateral integrally formed juncture line for frictional contact with said uppermost item in said stack when in place, to thereupon pivot said laterally extending rear wall of said ejection means and said contact arm thereof upwardly to said raised position.

9. A dispensing device for dispensing an uppermost item from the top of a stack of such items as set forth in claim 8, wherein said stack facing surface of said contact arm includes a planar layer of friction enhancing material, said projecting member comprises a thin strip of friction enhancing material which projects outwardly beyond the plane of said planar layer of friction enhancing material.

10. A dispensing device for dispensing an uppermost item from the top of a stack of such items as set forth in claim 8, wherein said stack facing surface of said contact arm includes a planar layer of friction enhancing material, said projecting member comprises a laterally extending integrally formed rib which projects outwardly beyond the plane of said planar layer of friction enhancing material.

11. A dispensing device for dispensing an uppermost cup type coffee filter from the top of an inverted stack of such cup type coffee filters, comprising movable ejection means movable between a raised position above said stack and a lowered position for dispensing said uppermost cup type coffee filter from the top of said stack, raising means to move said ejection means to said raised position without moving said uppermost coffee filter, and dispensing means to dispense said uppermost coffee filter from the top of said stack when said ejection means is lowered to and remains in said lowered position until said uppermost coffee filter is dispensed.

12. A dispensing device for dispensing an uppermost cup type coffee filter from the top of an inverted stack of such cup type coffee filters as set forth in claim 11, including a housing to receive said inverted stack of said coffee filters, said housing having an upper wall, an opening through said upper wall, said movable ejection means being positioned above said upper wall of said housing and said opening therethrough, and stack biasing means to bias said inverted stack toward said upper wall and toward said movable ejection means.

13. A dispensing device for dispensing an uppermost cup type coffee filter from the top of an inverted stack of such cup type coffee filters, comprising movable ejection means movable between a raised position above said stack and a lowered position for dispensing said uppermost cup type coffee filter from the top of said stack, raising means to move said ejection means to said raised position without moving said uppermost coffee filter, and dispensing means to dispense said uppermost coffee filter from the top of said stack when said ejection means is lowered to and remains in said lowered position until said uppermost coffee filter is dispensed, including a housing to receive said inverted stack of said coffee filters, said housing having an upper wall, an opening through said upper wall, said movable ejection means being positioned above said upper wall of said housing and said opening therethrough, and stack biasing means to bias said inverted stack toward said upper wall and toward said movable ejection means, wherein said dispensing means includes a carrier member positioned above said upper wall of said housing and said opening therethrough being slidable between a first position and a second position, said ejection means being carried by said carrier member, said ejection means being in said lowered position when said carrier member is moved toward and in said first position and in said raised position when said carrier member is moved toward said second position.

14. A dispensing device for dispensing an uppermost cup type coffee filter from the top of an inverted stack of such cup type coffee filters as set forth in claim 13, wherein said ejection means includes a contact arm movable into registration with said inverted stack having a stack facing surface.

15. A dispensing device for dispensing an uppermost cup type coffee filter from the top of an inverted stack of such cup type coffee filters as set forth in claim 14, wherein said ejection means includes a contact arm movable into registration with said opening through said upper wall of said housing and said inverted stack, said contact arm having a stack facing surface, said stack facing surface of said contact arm having a friction enhancing surface.

16. A dispensing device for dispensing an uppermost cup type coffee filter from the top of an inverted stack of such cup type coffee filters as set forth in claim 15, wherein said dispensing means includes a carrier member positioned above said upper wall and opening of said housing being slidable between a first position and a second position, said ejection means being carried by said carrier member, said ejection means being in said lowered position when said carrier member is moved toward and in said first position and in said raised position when said carrier member is moved toward said second position, and biasing means to bias and slide said carrier member from said second position toward said first position thereby moving said ejection means to said lowered position.

17. A dispensing device for dispensing an uppermost cup type coffee filter from the top of an inverted stack of such cup type coffee filters as set forth in claim 16, wherein said ejection means includes a laterally extending rear wall terminating at one side in a first side edge and at the opposite side in a second side edge, said rear wall having an upper lateral edge and a lower lateral edge extending between said first and second side edges, said contact arm extending from said lower lateral edge of said laterally extending rear wall and substantially normal thereto along a lateral integrally formed juncture line, a first pivot member extending laterally outwardly from said first side edge of said laterally extending rear wall adjacent said upper lateral edge thereof for reception in a facing side wall aperture of said carrier member, a second pivot member extending laterally outwardly from said second side edge of said laterally extending rear wall adjacent said upper lateral edge thereof for reception in a facing side wall aperture of said carrier member, said raising means includes a projecting member which projects outwardly from said stack facing surface of said contact arm at a location near said lateral integrally formed juncture line for frictional contact with said uppermost item in said stack when in place, to thereupon pivot said laterally extending rear wall of said ejection means and said contact arm thereof upwardly to said raised position.

18. A dispensing device for dispensing an uppermost cup type coffee filter from the top of an inverted stack of such cup type coffee filters as set forth in claim 17, wherein said stack facing surface of said contact arm includes a planar layer of friction enhancing material, said projecting member comprises a thin strip of friction enhancing material which projects outwardly beyond the plane of said planar layer of friction enhancing material.

19. A dispensing device for dispensing an uppermost cup type coffee filter from the top of an inverted stack of such cup type coffee filters as set forth in claim 18, wherein said stack facing surface of said contact arm includes a planar layer of friction enhancing material, said projecting member comprises a laterally extending integrally formed rib which projects outwardly beyond the plane of said planar layer of friction enhancing material.

20. A dispensing device for dispensing an uppermost cup type coffee filter from the top of an inverted stack of such cup type coffee filters as set forth in claim 19, including a support base for said carrier member and said ejection means, said support base including a substantially flat floor, a pair of spaced apart longitudinally extending guide rails, said carrier member being slidably mounted on said floor between said pair of guide rails, a plurality of elongated longitudinally extending receiving slots through said floor of said support base opening to said opening through said upper wall of said housing, said contact arm of said ejection means being receivable in and through a one of said plurality of receiving slots when pivoted downwardly, including a first additional contact arm extending forwardly from said lower laterally extending edge of said rear wall of said ejection means and substantially normal thereto, said first additional contact arm being receivable in and through a second one of said plurality of receiving slots when pivoted downwardly.

21. A dispensing device for dispensing an uppermost cup type coffee filter from the top of an inverted stack of such cup type coffee filters as set forth in claim 20, including a second additional contact arm extending forwardly from said lower laterally extending edge of said rear wall of said ejection means and substantially normal thereto, said second additional contact arm being receivable in a third one of said plurality of receiving slots when pivoted downwardly.

\* \* \* \* \*